United States Patent Office 3,591,383
Patented July 6, 1971

3,591,383
COLOR PHOTOGRAPHIC LIGHT SENSITIVE MATERIAL CONTAINING CYAN COUPLER
Makoto Yoshida, Yasusuhi Oishi, and Momotoshi Tsuda, Kanagawa, Japan, assignors to Fuji Photo Film Company, Ltd., Kanagawa, Japan
Filed Oct. 14, 1968, Ser. No. 767,171
Claims priority, application Japan, Oct. 13, 1967, 42/65,830
Int. Cl. G03c 1/40, 7/32
U.S. Cl. 96—74                                  9 Claims

ABSTRACT OF THE DISCLOSURE

A color photographic material having a light-sensitive silver halide emulsion layer containing a cyan coupler yielding a dye having its main absorption in a suitable red wave length region and having a lowered green absorption. The coupler is represented by the following formula:

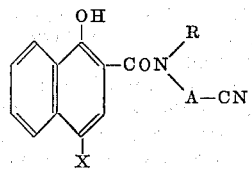

The representative moieties set out above are specifically defined in the specification.

BACKGROUND OF THE INVENTION

Field of the invention

The present invention relates generally to color photography and more particularly to a color photographic light-sensitive material having a photographic silver halide emulsion containing a 1-hydroxy-2-naphthamide derivative having a N-cyanoalkylene group as a cyan coupler.

DESCRIPTION OF THE PRIOR ART

To obtain a cyan color image in color photography by a subtractive color process, there has been widely employed a method in which an indoaniline dye is formed by the coupling reaction of a phenol derivative, or a naphthol derivative (as the cyan coupler) with the oxidation product of a p-phenylenediamine derivative as the color developer, in particular N,N-dialkyl-p-phenylene (or p-tolylene)-diamine.

In color reproduction by a subtractive color process, the cyan color image has a red absorption in the wave length range of 600–700 m$\mu$. The preferable absorption characteristics of a cyan color image is that the cyan color image has a strong absorption in the foresaid wave length range but the absorption in other wave length ranges, that is, in the blue range of less than 500 m$\mu$, and the green range of 500–600 m$\mu$, is as low as possible.

However, the sensitivity of the human eye to light depends largely on the wave length of the light. With light of from orange to red having a wave length longer than 600 m$\mu$, the sensitivity of the eye decreases with increase in the wave length, and the sensitivity of the eye to light having a wave length longer than 670 m$\mu$. is extremely low. Accordingly, in order to provide a high visual density to a color photographic element used for direct observation by the unaided eye, such as, positive color films, color printing papers, or reversal color films, it is desirable that a cyan color image has a high extinction coefficient in the wave length range of 600–670 m$\mu$. However, since a cyan color image generally has a long absorption tail (foot) at the shorter wave length side of the main absorption band, if the main absorption band is brought towards the shorter wave length side to too great of an extent, the undesirable green absorption is increased.

Therefore, it is desirable to have a cyan coupler capable of giving a cyan color image having a high visual density which illustrates an absorption maximum at the shorter wave length side with less green absorption.

Hitherto, as naphthol series cyan couplers compounds having the following formulas have been known:

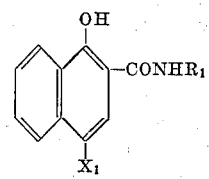

Formula 1 and

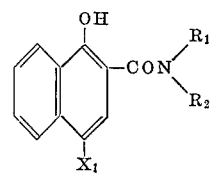

Formula 2 wherein $R_1$ represents an aliphatic residual group or an aromatic residual group, $R_2$ represents an aliphatic residual group, $X_1$ represents a group capable of being isolated when the compound causes coupling.

In addition to the chemical structure of the coupler, the chemical structure of the developer has a large influence on the absorption of the cyan color image. The absorption maximums (in a butyl acetate solution) of the dyes obtained by coupling a cyan coupler, i.e., 1-hydroxy-2-N-n-butyl-naphthoamide, with the typical developers shown below, are illustrated in the following table.

$$H_2N-\bigcirc-N\begin{matrix}C_2H_5\\C_2H_5\end{matrix} \qquad \text{Developer } a.[1]$$

$$H_2N-\bigcirc-N\begin{matrix}C_2H_5\\C_2H_4OH\end{matrix} \qquad \text{Developer } b.[1]$$

$$H_2N-\bigcirc-N\begin{matrix}C_2H_5\\C_2H_5\end{matrix} \quad (CH_3) \qquad \text{Developer } c.[1]$$

$$H_2N-\bigcirc-N\begin{matrix}C_2H_5\\C_2H_4NHSO_2CH_3\end{matrix} \quad (CH_3) \qquad \text{Developer } d.[1]$$

$$H_2N-\bigcirc-N\begin{matrix}C_2H_5\\C_2H_4OH\end{matrix} \quad (CH_3) \qquad \text{Developer } e.[1]$$

[1] See the following table:

TABLE 1

| Developer | a | b | c | d | e |
|---|---|---|---|---|---|
| Wave length (m$\mu$) of the absorption maximum | 648 | 650 | 669 | 664 | 673 |

In particular, among the aforesaid developers, those having the substituent at the ortho-position of the primary amino group (developers c, d, and e) are desirable, as they give color images having a high heat resistance and a high humidity resistance. However, as shown in the above table, the spectral absorption of the color images obtained by employing these "desirable" developers appears at the longer wave length side.

The compound represented by the aforesaid Formula 1 has been widely used as a cyan forming coupler, and when this compound is used with a N,N-di-substituted-p-phenylenediamine as the developer (developer *a* or *b* shown above), it will give a cyan color image having a high visual density. On the other hand, when other N,N-di-substituted-p-phenylenediamine derivatives having a substituent at the ortho-position to the primary amino group (e.g., developers *c*, *d*, and *e*) are employed as the developer, the cyan color image obtained is excellent in its heat resistance and humidity resistance, but the absorption is at the longer wave length side, and the visual density thereof is low. In order to obtain a sufficient visual density in color reproduction using a combination as above, a large amount of the coupler and silver halide must be incorporated into a light-sensitive emulsion layer, which results in excessive thickening of the light-sensitive emulsion layer, and thus reduces the sharpness of the image of the light-sensitive emulsion layer and the developing rate.

A combination of the compound represented by Formula 2 and developer *a* or *b* and also developer *c*, *d* or *e*, as described above, provides a cyan color image having a spectral absorption characteristic which is excessively exhibited in the shorter wave length side. The cyan color image may have high visual density in the red region, but as the color image absorbs green light to a considerable extent, the color reproducibility in color photography becomes unsatisfactory utilizing this combination.

SUMMARY OF THE INVENTION

It has been discovered that a color photographic element having a light-sensitive silver halide emulsion layer containing a cyan coupler yielding a dye having its main absorption in a suitable red wave length region and having a lower green absorption may be obtained by utilizing a cyan coupler represented by the following formula:

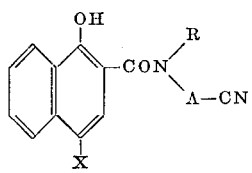

wherein R represents a mono-valent non-cyclic hydrocarbon group having from 8–18 carbon atoms or an aryl group, A represents a di-valent non-cyclic hydrocarbon group having from 1–3 carbon atoms, and X represents a hydrogen atom or a halogen atom.

Thus, an object of the present invention is to provide a color photographic light-sensitive material having a silver halide emulsion layer containing a cyan-forming coupler yielding a dye having its main absorption in a suitable red wave length region, and having a lowered green absorption.

DESCRIPTION OF THE PREFERRED EMBODIMENTS

Figure 1:
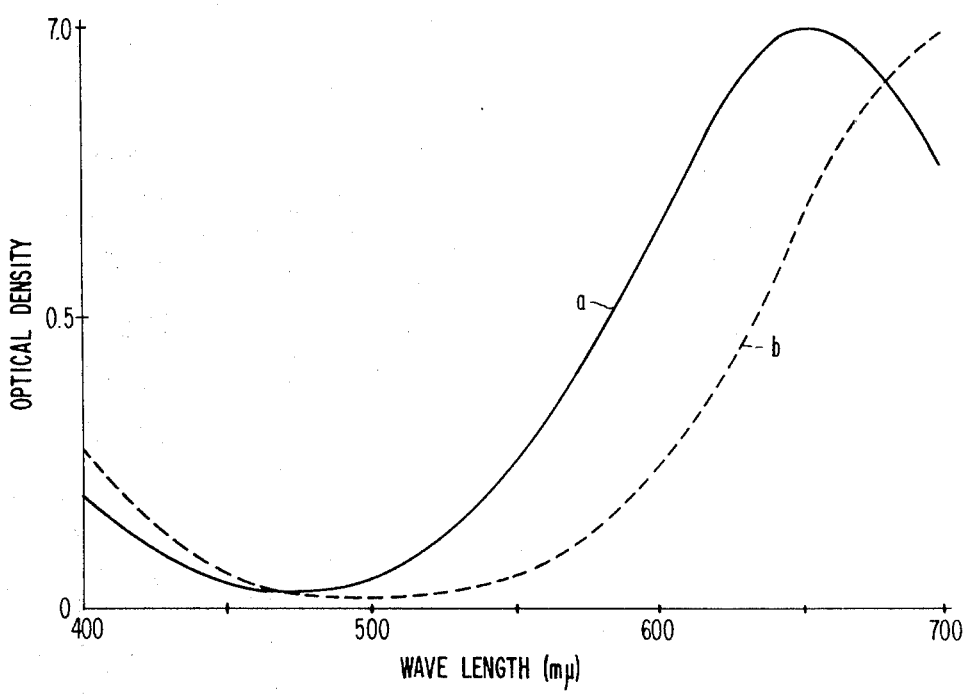
FIG. 1 illustrates the spectral absorption curves of cyan images obtained upon processing films containing the compound of this invention (*a*) and a comparative cyan coupler (*b*).

The objects of this invention are accomplished by incorporating, into a silver halide emulsion layer, the compound represented by the following general formula, which serves as a coupler forming a cyan color image:

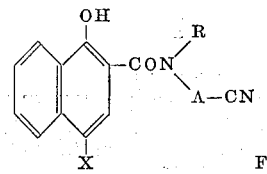

Formula 3 wherein R represents a mono-valent noncyclic hydrocarbon group having 8–18 carbon atoms or an aryl group, A represents a di-valent noncyclic hydrocarbon group having 1–3 carbon atoms, and X represents a hydrogen atom or a halogen atom.

As illustrative of the mono-valent noncyclic hydrocarbon group employed as group R in the above formula, there is: an octyl group, a decyl group, a dodecyl group, a hexadecyl group, an octadecyl group, a 2-ethylhexyl group, a 2-methylnonyl group, and a 2-ethyldecyl group. As illustrative of the aryl group there is: an octylphenyl group, a decylphenyl group, a dodecylphenyl group, a decyloxyphenyl group, and a dodecyloxyphenyl group.

As illustrative of the di-valent noncyclic hydrocarbon group designated as A in the above formula, there are: a methylene group, an ethylene group, a propylene group, a methyl-methylene group, a β-methylethylene group, and an ethylmethylene group.

In the compound represented by Formula 3, group R contributes an oil-solubility to said compound and for this purpose, the carbon number of said group is suitably 8–18. If the carbon number is less than 8, a part of the coupler incorporated in the silver halide emulsion will be dissolved in the developer solution, and will be diffused into adjacent emulsion layers. This will reduce the color reproducing function of the color photographic light-sensitive element. On the other hand, if the carbon number of the group is larger than 18, the molecular weight of the coupler is increased, which will reduce the red extinction coefficient per unit weight or unit volume of the cyan dye formed and, therefore, in order that the color emulsion layer has a definite red extinction coefficient, the thickness of the emulsion layer must be increased. This is very disadvantageous.

Also, the position of absorption maximum of the cyan dye obtained is varied according to the carbon number of group A of Formula 3, the relation of which is shown in the following table.

TABLE 2

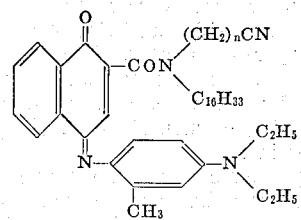

The absorption maximum of the above coupler (measured in an ethyl acetate solution).

| $n=$ | 1 | 2 | 3 |
|---|---|---|---|
| Wave length of maximum absorption in m$\mu$ | 660 | 645 | 640 |

Thus, by properly selecting a combination of the carbon numbers of group A (of the coupler represented by Formula 3) and the kind of developer used with said coupler (according to the purpose of the light sensitive material), it is possible to control the spectral absorption characteristics of the cyan color image thus obtained to best suit the needs of the material. If the carbon number of group A of Formula 3 is larger than 4, the defect develops that the green absorption by the dye obtained tends to increase, thereby yielding unsatisfactory results.

In Formula 3, X is a hydrogen atom or a halogen atom such as chlorine, bromide or iodine. By using a conventional coupler having a structure as Formula 3 wherein X is, however, an isolatable hydrophilic residual group such as —$SO_3H$, a cyan color image having a high visual density may be obtained. However, this image has a serious fault in that the green density of the color image is higher than the color image obtained by using the coupler of this invention (wherein X is a hydrogen atom or a halogen atom).

Typical examples of the coupler used in the present invention are shown below:

Coupler I
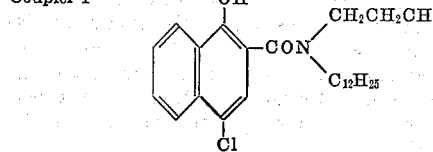

Coupler II
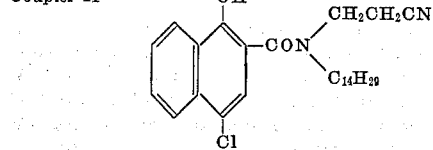

Coupler III
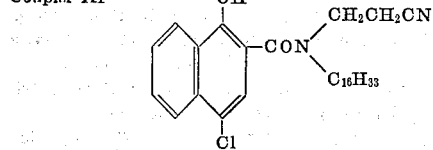

Coupler IV
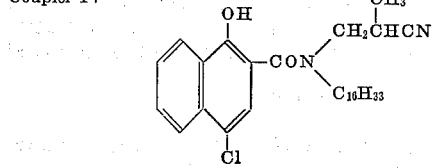

Coupler V
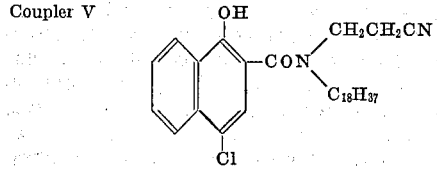

Coupler VI
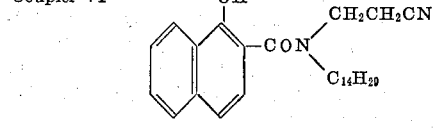

Coupler VII
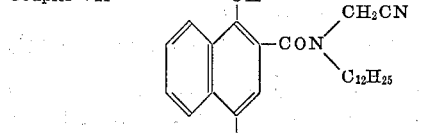

Coupler VIII
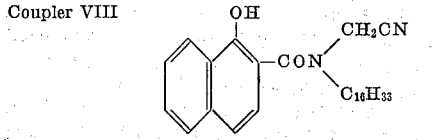

Coupler IX
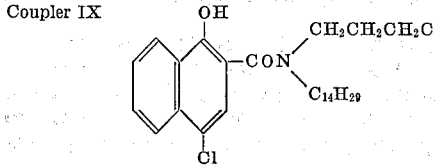

Coupler X
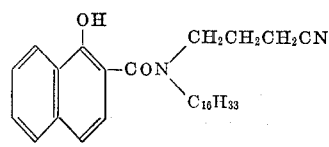

Coupler XI
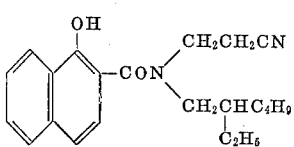

Coupler XII
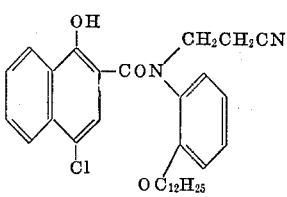

The coupler used in the present invention may be incorporated in a light-sensitive emulsion layer by the so-called oil solution system, that is, by a system in which a solution of the coupler in an organic solvent is dispersed in an aqueous medium and the dispersion thus obtained is added to a photographic silver halide emulsion. The aforesaid coupler of this invention can be very easily dissolved in organic solvents and hence, by using only a small amount of organic solvent, the coupler is easily and stably emulsified, and can thus be added to a photographic silver halide emulsion. Thus, the use of a small amount of organic solvent enables the formation of a thin, strong light-sensitive emulsion layer. Furthermore, the tendency to crystallization of the coupler in the light-sensitive emulsion layer is lowered. Further, the cyan coupler of this invention which has been incorporated in a light-sensitive emulsion by an oil solution method shows a very high coupling activity.

When the light-sensitive silver halide emulsion layer containing the cyan coupler described above is developed in a standard color developer, the emulsion layer shows a good sensitivity, gradation and coupling density, and the addition of the cyan coupler will not cause the formation of fogs in the light-sensitive emulsion layer.

The cyan color image obtained by processing the color photographic light-sensitive element of this invention has good resistance to humidity and heat, and the light-sensitive element thus processed can be stably preserved for long periods of time even under severe conditions of high humidity and high temperature.

The novel cyan coupler represented by Formula 3 which is used in the present invention can be used with other known cyan-forming couplers in a same silver halide emulsion layer. In particular, by using the novel cyan coupler of this invention with the cyan coupler represented by Formula 1 in various mixing ratios, desired spectral absorption characteristics between those of the individual cyan dyes formed by the coupling of said couplers can easily be obtained. This means that by the application of this invention, an optimum cyan color hue can be easily obtained by controlling the mixing ratio of the cyan coupler of this invention and the aforesaid known coupler, without selecting each cyan coupler as particularly adapted to the developer employed. Of course, proper selection enables the pre-selection of the final cyan hue desired.

The present invention can be applied to various kinds of color photographic light-sensitive elements, but among them, particularly good results can be obtained when the invention is applied to color photographic light-sensitive elements that are directly viewed with the unaided eye, such as, color positive films, color printing papers and color reversal films.

Moreover, the present invention can be applied not only to multiple-layer type color photographic light-sensitive elements comprising a support bearing thereon more than two silver halide emulsion layers (each having a different color sensitivity and containing an anti-diffusing coupler corresponding to each sensitivity) but also to a mixed grain type color photographic light-sensitive element comprising a support and a silver halide emulsion layer comprising a mixture of more than two types of fine particles, each having a different color sensitivity and containing an anti-diffusing coupler corresponding to each sensitivity.

The coupler of the present invention may be easily prepared by forming a secondary amino compound having a nitrile group by the cyanoalkylation of an aliphatic nitrile having one double bond and less than 4 carbon atoms and a primary amino compound, and by condensing the secondary amino compound thus obtained with a naphthoic acid derivative.

The preparation of the cyan couplers used in this invention will now be explained in detail by the following example.

Preparation 1

(1–a): Preparation of N-$\beta$-cyanoethyl-N-dodecylamine:

In a one-liter three-necked flask equipped with a stirrer, a thermometer, a condenser, and a dropping funnel there was fused, by heating, 185 g. (1 mole) of dodecylamine. While maintaining the inside temperature at 50–60° C., 64 g. (1.2 moles) of acrylonitrile was added through the dropping funnel over a ten minute period, with stirring. After stirring for a further 6 hours at the above temperature, the reaction product was poured into a 500 ml. Claisen flask and subjected to a vacuum distillation therein to provide 202 g. (yield 85%) of the aforesaid dodecylamine, having a boiling point at 153–158° C./1 mm. Hg.

(1–b) Preparation of N-dodecyl-N-$\beta$-cyanoethyl-4-chloro-1-hydroxy-2-naphthamide (Formula I):

A mixture of 119 g. of the N-$\beta$-cyanoethyl-N-dodecylamine prepared above and 150 g. of 4-chloro-1-hydroxy-2-naphthoic acid phenyl ester was charged in a 500 ml. flask and heated for about 1 hour to an interior temperature of about 160° C. in an oil bath. Phenol by-product was removed by vacuum distillation. The residual oily product was dissolved, by heating, in 800 ml. of hexane to precipitate white crystals, which were recovered by filtration and recrystallized from a mixed solvent of benzene and ethanol (1:1) to provide 170 g. (yield 77%) of the above-mentioned cyan coupler (Formula I), having a melting point of 88° C.

Preparation 2

(2–a) Preparation of N-$\beta$-cyanoethyl-N-tetradecylamine:

The same procedure as in Example (1–a) was repeated employing tetradecylamine, instead of dodecylamine, and 216 g. (yield 81%) of the compound having a boiling point of 185–190° C./2 mm. Hg was formed.

(2–b) Preparation of N-tetradecyl-N-$\beta$-cyanoethyl-4-chloro-1-hydroxy-2-naphthamide (Formula II):

The same procedure as Example (1–b) was repeated employing the N-$\beta$-cyanoethyl-N-tetradecylamine obtained above, instead of N-$\beta$-cyanoethyl-N-dodecylamine, to provide the compound, having a melting point of 68–69° C. The amount of the product was 165 g. (yield 70%).

Preparation 3

(3–a) Preparation of N-$\beta$-cyanoethyl-N-hexadecylamine:

The same procedure as in Example (1–a) was repeated employing hexadecylamine, instead of dodecylamine, to provide 235 g. (yield 80%) of the above-described hexadecylamine, having a boiling point of 183–185° C./1 mm. Hg.

(3–b) Preparation of N-hexadecyl-N-$\beta$-cyanoethyl-4-chloro-1-hydroxy-2-naphthamide (Formula III):

The same procedure as in Example (1–b) was repeated employing the N-$\beta$-cyanoethyl-N-hexadecylamine prepared above, instead of N-$\beta$-cyanoethyl-N-dodecylamine, to provide 125 g. (yield 50%) of the above-mentioned cyan coupler (Formula III), having a melting point of 65–66° C.

Preparation 4

Preparation of N-tetradecyl-N-$\beta$-cyanoethyl-1-hydroxy-2-naphthamide (Formula VI):

The same procedure as in Example (1–b) was repeated employing the N-$\beta$-cyanoethyl-N-tetradecylamine prepared in Example (2–b), instead of N-$\beta$-cyanoethyl-N-dodecylamine, and also employing 1-hydroxy-2-naphthoic acid phenyl ester (instead of 4-chloro-1-hydroxy-2-naphthoic acid phenyl ester). By this procedure, 111 g. (yield 54%) of the cyan coupler, having a melting point of 46° C., was obtained.

Preparation 5

(5–a) Preparation of N-cyanomethyl-N-dodecylamine:

In a three-necked flask there was heated, with stirring, 93 g. of dodecylamine and 200 ml. of benzol. To the mixture there was added (dropwise) 28 g. of glyconitrile through the dropping funnel. Thereafter, the mixture was boiled for about 30 minutes, and benzene was removed therefrom by distillation under normal pressure. By subjecting the residual oil to a vacuum distillation, 73 g. (yield 68%) of the objective dodecylamine having a boiling point of 143–146° C./2 mm. Hg was obtained.

(5–b) Preparation of N-dodecyl-N-cyanomethyl-4-chloro-1-hydroxy-2-naphthamide (Formula VII):

The same procedure as in Example (1–b) was repeated employing the N-cyanomethyl-N-dodecylamine prepared above (instead of N-$\beta$-cyanoethyl-N-dodecylamine) to provide the objective cyan coupler having a melting point of 77–78° C. The amount of the product was 70 g. (yield 33%).

Preparation 6

Preparation of N-tetradecyl-N-$\gamma$-cyanopropyl-4-chloro-1-hydroxy-2-naphthamide (Formula IX):

A mixture of 43 g. of tetradecylamine and 200 ml. of ether was stirred at room temperature in a one-liter three-necked flask, and 15 g. of $\gamma$-bromobutyronitrile was gradually added to the mixture. After stirring for about 30 minutes at room temperature, the resultant mixture was boiled for 30 minutes on a warm water bath, the tetradecylaminehydrobromide formed was separated by filtration, and then ether was distilled off. The residual oil was poured into a 500 ml. flask, and after adding 60 g. of 4-chloro-1-hydroxy-2-naphtholic acid phenyl ester thereto, the mixture was subjected to the same procedure as in Example (1–b) to provide 40 g. (yield 42%) of the cyan coupler, having a melting point of 78° C.

Preparation 7

(7–a) Preparation of 2-dodecyloxy-(N-$\beta$-cyanoethyl) aniline:

A mixture of 80 g. of 2-dodecyloxyaniline, 15 g. of acrylonitrile, and 9 ml. of acetic acid was heated for 10 hours on a warm water bath. After adding 300 ml. of n-hexane, the resultant mixture was cooled to precipitate white crystals, which were separated and recrystallized from methanol to provide 40 g. (yield 42%) of the objective aniline having a melting point of 66–67° C.

(7–b) Preparation of N-(2-dodecyloxyphenyl)-N-($\beta$-cyanoethyl)-4-chloro-1-hydroxy-2-naphthamide (Formula XII):

The same procedure as in Example (1–b) was repeated employing the 2-dodecyloxy-(N-$\beta$-cyanoethyl)aniline prepared above (instead of N-$\beta$-cyanoethyl-N-dodecylamine), and the product was recrystallized from acetonitrile to provide the objective cyan coupler having a melting point of 61–62° C. The amount of the product was 181 g. (yield 68%).

The present invention will now be further described by the following examples, in which the merits of the cyan couplers of this invention are explained by comparison with similar known couplers which are shown below.

Comparative Coupler A

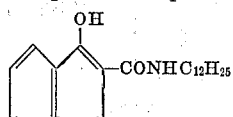

Comparative Coupler B

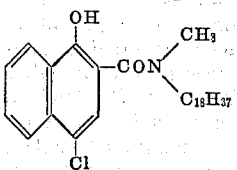

EXAMPLE 1

Two kinds of photographic films (K) and (L) were prepared as follows.

Photographic Film K

A mixture of 10 g. of Compound I, 20 g. of di-n-butyl phthalate, and 10 ml. of ethyl acetate was heated to 70° C., and the solution was dispersed in 200 ml. of an aqueous solution containing 15 g. of gelatin and 0.7 g. of sodium dodecylbenzene sulfonate by stirring for 30 minutes in a homogenizer. The dispersion thus prepared was mixed with 300 g. of a red-sensitive emulsion containing silver iodobromide in an amount of $6.0 \times 10^{-2}$ moles. After adding 20 ml. of a 3% acetone solution of triethylene phosphamide as a hardening agent and adjusting the pH thereof to 7.0, the resultant dispersion was applied to a triacetyl cellulose film at a dry thickness of $4.0 \times 10^{-4}$ cm. The coated film contained the coupler of an area density of $1.0 \times 10^{-3}$ mole/sq. m.

Photographic Film L

The same procedure as above was repeated while using 8.8 g. of Comparative coupler (A) instead of Compound I in preparing the comparative film.

When the films were exposed and processed as shown below, Film (K) provided a cyan color image having its absorption maximum at 655 mµ and showing a high visual density, while Film (L) provided a cyan color image having its absorption maximum at about 710 mµ and showing a low visual density. The spectral absorption curves of the cyan color images thus formed are shown in FIG. 1 of the accompanying drawings, in which curve (a) stands for the spectral absorption curve of the cyan color image obtained by processing Film (K) containing Compound I, and curve (b) stands for the spectral absorption curve of the cyan image of Film (L) containing Comparative compound (A).

The color developing process employed in the example, was as follows:

| Process | Temperature (° C.) | Time (min.) |
|---|---|---|
| Color development | 21 | 10 |
| Washing | 21 | 1 |
| First fixing | 21 | 4 |
| Washing | 21 | 3 |
| Bleaching | 21 | 3 |
| Washing | 21 | 2 |
| Secondary fixing | 21 | 3 |
| Washing | 18 | 20 |

The compositions used for the above processings were as follows:

Color developer (1) (pH 10.5)

Water—1 liter.
2-amino-5-N,N-diethylaminotoluene hydrochloride (color developer)—2.5 g.
Sodium sulfite (anhydrous)—10.0 g.
Sodium carbonate (monohydrate)—47.0 g.
Potassium bromide—2.0 g.

Fixing solution (pH 4.5)

Water—1 liter.
Sodium thiosulfate (hexa-hydrate)—80 g.
Sodium sulfite—5 g.
Borax—6 g.
Glacial acetic acid—4 ml.
Potassium alum—7 g.

Bleaching solution (pH 7.2)

Water—1 liter.
Ferricyanide—17 g.
Boric acid—10 g.
Borax—5 g.
Potassium bromide—7 g.

EXAMPLE 2

Two types of photographic films (M) and (N) were prepared as follows.

Photographic Film M

A mixture of 125 g. of Compound III, 10 g. of di-n-butyl phthalate, and 20 ml. of butyl acetate was heated to 70° C. and the resultant solution was added to 200 ml. of an aqueous solution containing 0.7 g. of sodium dodecylsulfate and 10 g. of gelatin at 60° C. This was followed by vigorous stirring by means of a colloid mill to form a fine dispersion.

The whole amount of the dispersion obtained above was added to 500 g. of a red-sensitive emulsion containing 0.1 mole of silver chlorobromide. After adding 30 ml. of a 3% acetone solution of triethylene phosphamide and 7 g. of polyvinyl pyrrolidone and adjusting the pH thereof to 7.0, the dispersion was applied to a triacetyl cellulose film at a dry thickness of $5.0 \times 10^{-4}$ cm. The coated film contained therein the coupler at an area density of $1.2 \times 10^{-3}$ mole/sq. m.

Photographic Film N

The same procedure as above was repeated while using 12.2 g. of Comparative coupler (B) instead of Compound III to provide the comparative photographic film N.

When the films thus prepared were exposed and subjected to the color photographic processings shown in Example 1, they showed the photographic properties described in the following table.

| Film | Coupler | Fog | Red density (644 mµ) Relative sensitivity | Gamma | Maximum density |
|---|---|---|---|---|---|
| M | III | 0.08 | 100 | 2.7 | 3.0 |
| N | B | 0.08 | 90 | 1.8 | 2.4 |

Figure 2:
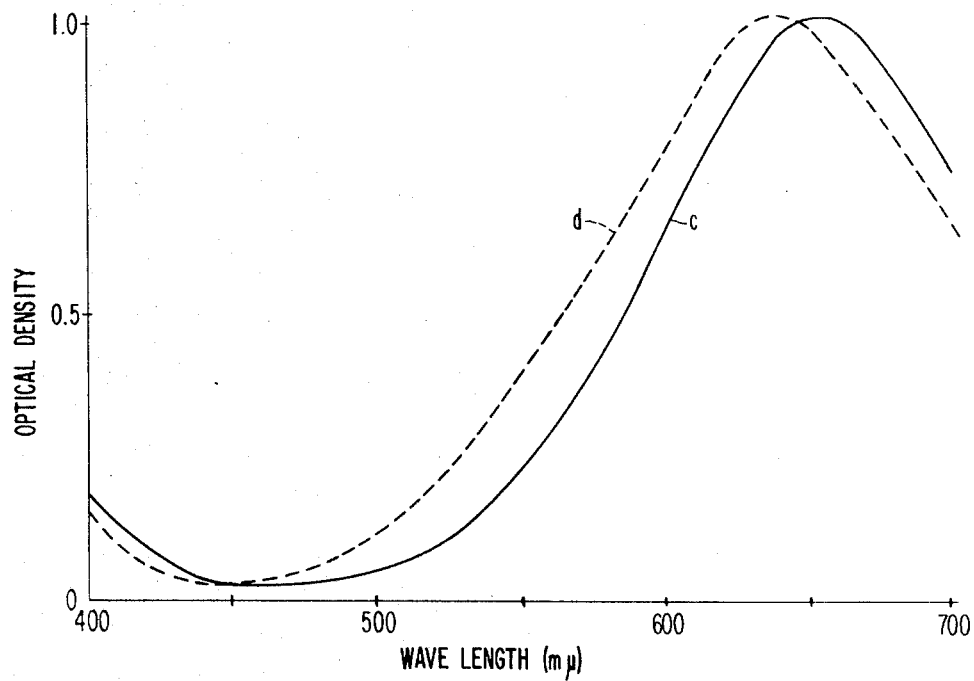
FIG. 2 represents the spectral absorption curves obtained upon processing a color film using another cyan coupler of the present invention (*c*) and a comparative cyan coupler (*d*).

The spectral absorption curves of the cyan color images obtained by processing films M and N are shown in FIG. 2, in which curve (c) stands for the spectral absorption curve of the cyan color image of Film M (containing Compound III), and curve (d) stands for the spectral absorption curve of the cyan color image obtained by processing the film N (containing Compound B). From these results, it is clear that novel coupler III of this invention is excellent, when compared with comparative coupler B in that the cyan color image obtained by using the coupler of this invention had a lowered green absorption at 500–600 mµ.

EXAMPLE 3

An anti-humidity test of the color images was conducted for the film samples prepared and developed as in Example 1. That is, the samples developed were stored at a temperature of 60° C. and at a relative humidity of 75%. Thereafter, the density deterioration of the color images was measured, the results of which are as follows.

Remaining percentage of the density of color image after the anti-humidity test (initial density 1.0)

| Film | Coupler | Stored days | | |
|---|---|---|---|---|
| | | 10 | 20 | 30 |
| K | I | 100 | 100 | 99 |
| L | A | 86 | 81 | 75 |

From these results, it is clear that the color image of Film K (containing Coupler I) can be stably stored under conditions of high temperature and high humidity, under which the cyan color image of Film L (containing Comparative coupler (A)) was considerably faded.

EXAMPLE 4

A mixture of 2.8 g. of Compound I, 2.4 g. of Compound A, 7 ml. of di-n-butyl phthalate, and 10 ml. of ethyl acetate was heated to 60° C., and the solution thus prepared was added to 120 ml. of a solution containing 10 g. of gelatin and 0.4 g. of sodium dodecylbenzene sulfonate followed by finely dispersing them by means of a homogenizer. The total amount of the dispersion was added to 250 g. of a red-sensitive emulsion containing silver chlorobromide in an amount of $5 \times 10^{-2}$ moles. After adding 15 ml. of a 3% acetone solution of triethylene phosphamide as a hardening agent, the resultant dispersion was applied to a triacetyl cellulose film as a second emulsion layer. On the triacetyl cellulose film there had been initially formed a blue-sensitive emulsion layer containing Coupler (C) which has the following structure, as the first layer.

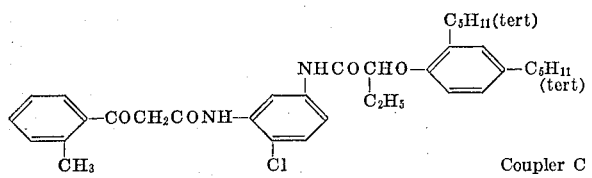

Coupler C

Onto the second emulsion layer, there was further applied as a third emulsion layer a green-sensitive emulsion containing Coupler D which has the following structure:

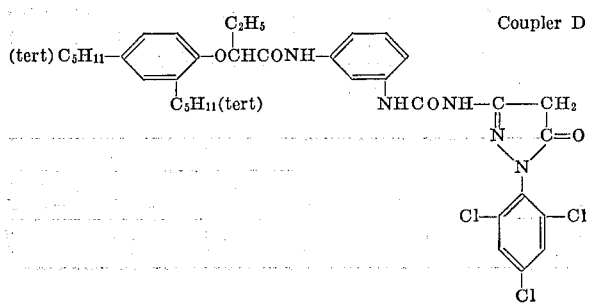

Coupler D

In this case, the second emulsion layer contained the coupler in an amount of $10^{-3}$ mole/sq. m.

The thus obtained color photographic positive film was exposed stepwise to red light and subjected to the color photographic processings shown in Example 1. The cyan color image thus obtained has its absorption maximum at 685 mμ and showed the good sensitivity, gradation and maximum density required of a color positive. Also, when the light-sensitive film was subjected to a printing exposure, together with image-exposed color photographic negative film, and was thereafter developed and subjected to color processing as above, a clear natural color print film was obtained.

EXAMPLE 5

Into 250 ml. of water, there was dissolved, by heating, 6.5 g. of Compound E, represented by the following formula:

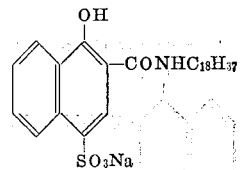

Formula E

A mixture of 9.0 g. of Coupler III, 12 g. of di-n-butyl phthalate, and 10 ml. of ethyl acetate was heated to 60° C. and the solution was added to 200 ml. of an aqueous solution containing 15 g. of gelatin and 50 ml. of the solution containing Compound E prepared above. The resultant mixture was passed through a colloid mill ten times to finely disperse it. The total amount of the dispersion was added to 400 g. of a red-sensitive photographic emulsion containing 0.2 mole of silver iodobromide. The dispersion was mixed with 200 ml. of the residual solution of Compound E and 800 ml. of water and its pH was adjusted to 5.5. Thereafter, the resulting dispersion was mixed with 30 ml. of a 3% acetone solution of triethylene phosphamide as a hardening agent and 4 ml. of a 5% aqueous solution of sodium dodecylbenzene sulfonate as a wetting agent.

Onto a baryta-coated paper there were sequentially applied as a first layer, a blue-sensitive emulsion containing a dispersion of Coupler C (described in Example 4), a green-sensitive emulsion containing a dispersion of Coupler D as a second layer, a red-sensitive emulsion, prepared as above, as a third layer, and a gelatin solution containing a dispersion of ultraviolet absorption compound F, having the following structure, to provide a color printing paper.

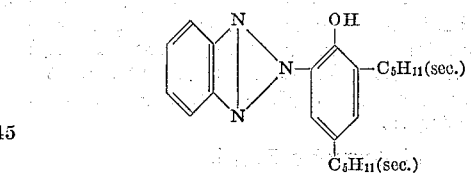

Compound F

In this case, the dry thickness of the red-sensitive emulsion layer was $4 \times 10^{-4}$ cm. and the emulsion layer contained the cyan-forming coupler in an amount of $5 \times 10^{-4}$ mole/sq. m.

The color printing paper was stepwise exposed to red light, developed for 8 minutes at 25° C. in a color developer having the following composition, and then subjected to a first fixing, bleaching, secondary fixing, and washing, as in Example 1.

Color developer composition (2) (pH 10.0)

Water—1 liter
Benzyl alcohol—12.6 ml.
Sodium hexametaphosphate—2.0 g.
Sodium sulfite (anhydrous)—2.1 g.
Sodium carbonate (mono-hydrate)—27.0 g.
Potassium bromide—0.8 g.
Color developer d ($3/2H_2SO_4 \cdot H_2O$)—5.0 g.

The cyan color image thus obtained had its absorption maximum at 680 mμ and provided sufficient sensitivity, gradation, and maximum density for use as a color print. Also, by processing the color printing paper as mentioned above after print-exposure through a color negative (image-exposed and developed), a clear natural color print was obtained.

Although the above examples illustrate many of the compositional ranges of the present invention, it has been found that from about 0.001 to about 1 mole of the cyan couplers of this invention per kilogram of the silver halide emulsion is preferred. When mixtures are utilized, the proportions should be varied accordingly.

What is claimed is:

1. A color photographic light-sensitive material comprising a support bearing thereon a silver halide-emulsion layer containing therein at least one cyan-forming coupler represented by the general formula

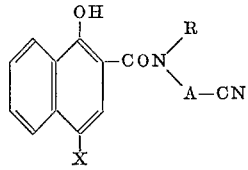

wherein R represents a member selected from the group consisting of a mono-valent noncyclic hydrocarbon group having 8–18 carbon atoms and an aryl group, A represents a di-valent noncyclic hydrocarbon group having 1–3 carbon atoms, and X represents a member selected from the group consisting of a hydrogen atom and a member selected from the group consisting of chlorine, bromine and iodine.

2. The color photographic light-sensitive material as claimed in claim 1 wherein said color photographic light-sensitive material is a color positive film.

3. The color photographic light-sensitive material as claimed in claim 1 wherein said light-sensitive material is a color printing paper.

4. The color photographic light-sensitive material as claimed in claim 1 wherein said light-sensitive material is a color photographic reversal film.

5. The color photographic light-sensitive material as claimed in claim 1 wherein said mono-valent noncyclic hydrocarbon group is selected from the class consisting of an octyl group, a decyl group, a dodecyl group, a hexadecyl group, an octadecyl group, a 2-ethylhexyl group, a 2-methylnonyl group, and a 2-ethyldecyl group.

6. The color photographic light-sensitive material as claimed in claim 1 wherein said aryl group is selected from the class consisting of an octylphenyl group, a decylphenyl group, a dodecylphenyl group, a decyloxyphenyl group, and a dodecyloxyphenyl group.

7. The color photographic light-sensitive material as claimed in claim 1 wherein said di-valent noncyclic hydrocarbon group is selected from the class consisting of a methylene group, an ethylene group, a propylene group, a methylmethylene group, $\beta$-methylethylene group, and an ethylmethylene group.

8. The color photographic light-sensitive material as claimed in claim 1 wherein said cyan-forming coupler is selected from the class consisting of N-dodecyl-N-$\beta$-cyanoethyl-4-chloro-1-hydroxy-2-naphthamide,
N-tetradecyl-N-$\beta$-cyanoethyl-4-chloro-1-hydroxy-2-naphthamide,
N-hexadecyl-N-$\beta$-cyanoethyl-4-chloro-1-hydroxy-2-naphthamide,
N-tetradecyl-N-$\beta$-cyanoethyl-1-hydroxy-2-naphthamide,
N-dodecyl-N-cyanomethyl-4-chloro-1-hydroxy-2-naphthamide,
N-tetradecyl-N-$\gamma$-cyanopropyl-4-chloro-1-hydroxy-2-naphthamide, and
N-(2-dodecyloxyphenyl)-N-($\beta$-cyanoethyl)-4-chloro-1-hydroxy-2-naphthamide.

9. Color photographic light-sensitive material as claimed in claim 1 wherein from about 0.001 to about 1 mole of said cyan-forming coupler per kilogram of the silver halide emulsion is present.

References Cited

UNITED STATES PATENTS

| 3,005,709 | 10/1961 | Coles | 96—100X |
| 3,226,230 | 12/1965 | Van Poucke | 96—100X |
| 3,418,129 | 12/1968 | Kimura et al. | 96—100 |
| 3,488,193 | 1/1970 | Vanden Eynde et al. | 96—100X |

WILLIAM D. MARTIN, Primary Examiner

R. HUSACK, Assistant Examiner

U.S. Cl. X.R.

96—22, 55, 100